W. J. WILSON.
MOTOR DRIVEN DENTAL ARTICULATOR.
APPLICATION FILED MAR. 17, 1919.

1,322,387.

Patented Nov. 18, 1919.
2 SHEETS—SHEET 1.

WITNESSES

INVENTOR
WALTER J. WILSON
BY
ATTORNEYS

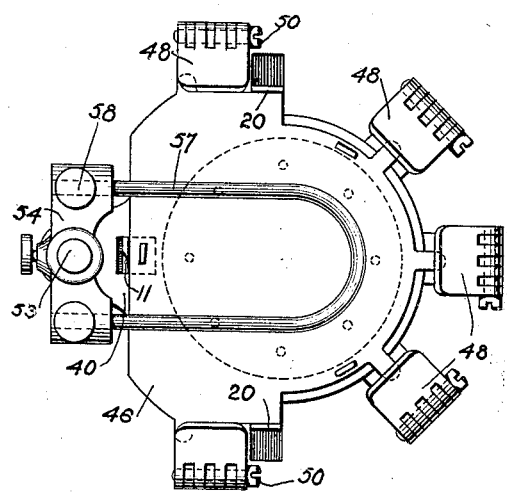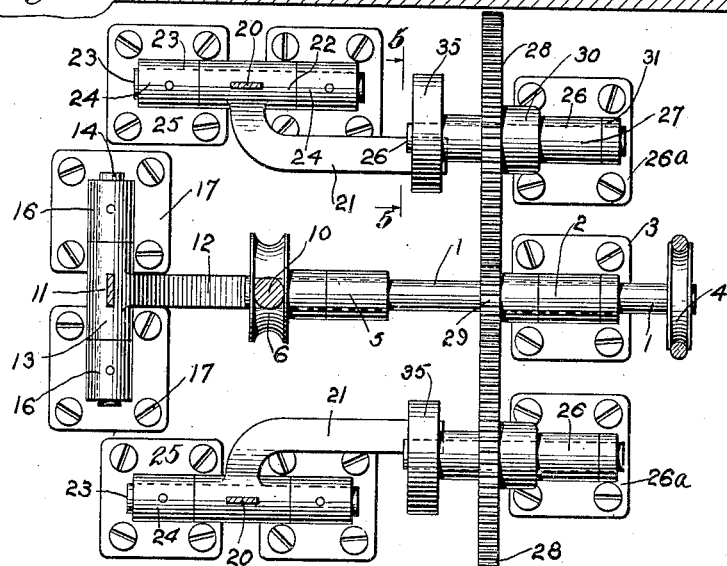

UNITED STATES PATENT OFFICE.

WALTER J. WILSON, OF PETERSBURG, INDIANA.

MOTOR-DRIVEN DENTAL ARTICULATOR.

1,322,387.   Specification of Letters Patent.   Patented Nov. 18, 1919.

Application filed March 17, 1919. Serial No. 283,049.

*To all whom it may concern:*

Be it known that I, WALTER J. WILSON, a citizen of the United States, and a resident of Petersburg, county of Pike, and State of Indiana, have invented a new and Improved Motor-Driven Dental Articulator, of which the following is a full, clear, and exact description.

This invention relates to articulators. More particularly it relates to a new and improved motor driven dental articulator for use in connection with the grinding and finishing of artificial teeth in practising the art of modern dental mechanics.

In my invention as disclosed and embodied within an application filed Mch. 17, 1919, Serial Number 283,048, I have described and claimed a hand-actuated dental articulator apparatus. That apparatus is illustrated in connection with the presently described power transmission means. It will be understood that this power driven transmission means can be used in connection with and for driving dental apparatus and articulating means, other than the one herewith illustrated.

An object of the present invention is to provide the design of a motor driven dental articulator which may be assembled in connection with any preferred form of teeth articulators, receive suitable motive power from any source such as an electric motor, and continuously operate the articulator until the teeth are adequately ground in shape to a desired engaged masticating relation one with the other.

It is a particular purpose of the presently described invention to provide motor driven means comprising a gear set or gear train coöperating through vibratory articulator arms to operate an articulator element. Another feature is to provide means for subjecting the articulating element to lateral and vertical articulating motion.

With the above and other objects in view, the invention has relation to a certain combination and arrangement of parts, an example of which is described in the following specification, pointed out in the appended claims and illustrated in the accompanying drawings, wherein:

Fig. 3 is a plan view of the articulator element, which is adapted to be driven by the presently described power transmission means.

Fig. 4 is a sectional view taken upon the line 4—4 of Fig. 1.

Figure 1:
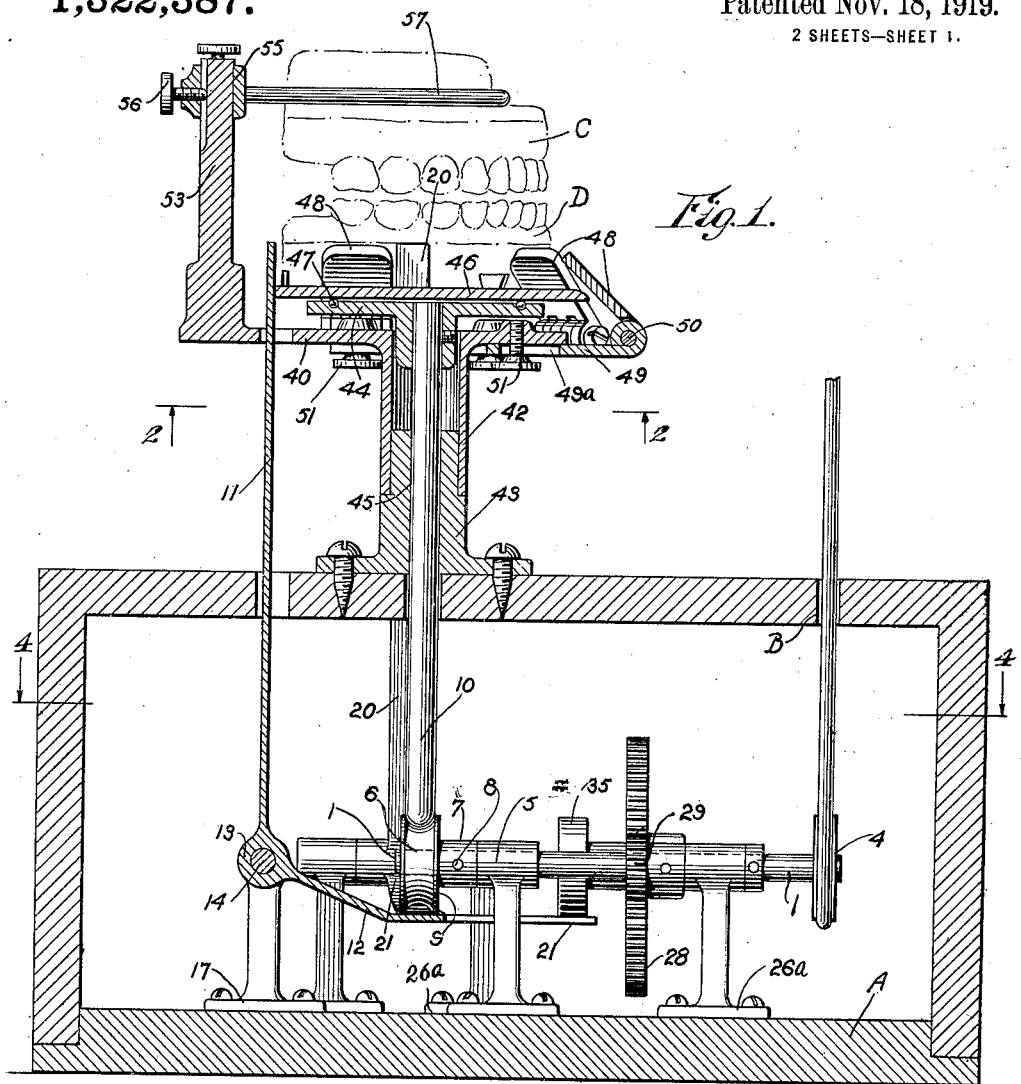
Figure 1 illustrates a side elevational view in vertical section, of the motor driven means shown in operative connection with an articulator element.
Figure 2:
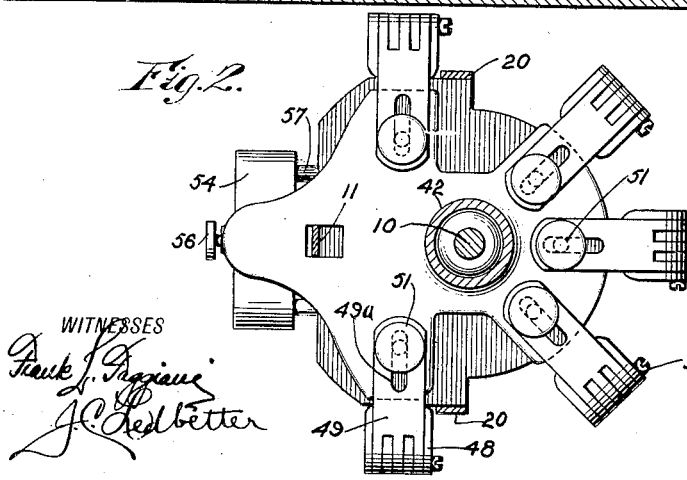
Fig. 2 is a section taken upon the line 2—2 of Fig. 1.
Figure 5:
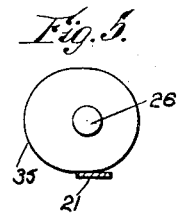
Fig. 5 illustrates a detailed view of a certain cam and articulator arm embodied within the transmission means comprising this invention.

The motor driven transmission means embodied in this invention will usually be installed in a case for preservation from dust and other abuse in use. The case will act as a suitable mount for supporting the articulating element which the transmission is adapted to operate.

In the drawings, the numeral 1 designates a drive shaft journaled in a bearing 2 supported from a base 3 secured to the floor of the inclosure case A. This drive shaft is fitted with a drive pulley 4, gear, or other means for receiving power from an electric motor which may be located distant from the case, or mounted upon the case. A belt, chain or other means used for transmitting power to the shaft 1 may be passed through a slot B in the case. The shaft 1 is further supported in a bearing 5, and a cam roller 6 provided with an integral hub 7 is fixed upon the shaft 1 by a pin 8. The cam 6 will preferably be grooved thus leaving flanges 9 which function as the peripheral cam face while an articulating shaft 10 engages the grooved portion and rides therein as hereinafter more fully described. A vibrating articulator arm comprising the vertical stem 11 and horizontal arm 12 integrally formed on a sleeve 13 is pivotally confined upon a shaft 14 journaled in bearings 16 supported from base plates 17. The arm 12 operates in contiguous relation with the cam 6, while the stem 11 extends upwardly through a slot provided in the case and coöperates with the articulator element hereinafter described.

Another set of articulator arms comprising vertical stems 20 and horizontal arms 21 integrally formed with a sleeve 22 is journaled and confined upon shafts 23 supported in fixed relation in bearings 24 mounted on base plates 25. This pair of vibratory articulator arms are mounted in the base in opposite relation one with the other and adapted to extend vertically upward through slots formed in the case, similar to the arm stem 11.

A pair of shafts 26 are mounted one upon either side of the drive shaft and parallel thereto. Said shafts 26 are journaled in bearings 27 supported from the bases 26ª. Gears 28 are fixed upon the shafts 26 and engage with a drive pinion 29 secured on the shaft 1. The hub 30 of the gear 28 and the sleeve 31 are each fixed upon said shaft, thus confining the gear 28 against longitudinal motion, thereby insuring proper alinement and engagement of the gear and drive pinion. Cams 35 are fixed upon the shafts 26 and revolved in engaged relation with the arms 21 of the vibratory arm set hereinbefore described. The several vibratory members comprising the vertical stems and horizontal arms are adapted to operate in an engaged relation with the cams, and function as a bell-crank capable of transmitting high frequency vibratory movement at their upper extremities due to the eccentricity of the revolving members 6 and 35 operating in connection therewith.

A description will now be given of the dental articulating element which may be mechanically operated from the transmission means just described.

A base 40 has integrally cast or formed therewith a receiving sleeve 42 which engages a flanged stem 43 secured to the top of the closure case A, and above the transmission means. A vibrating table 44 is fixed to the upper extremity of the articulator shaft 10. The articulator shaft is guided through a bore 45 in the stem 43, which confines this shaft in an engaged relation to its associate cam member of the transmission means. A tooth cast holder plate 46 is mounted on the vibrator table and may have interposed therebetween steel balls 47. The balls will be secured in seats formed in the member 44 and thus space the cast holder 46 slightly above the table. The vibratory arms or stems 11 and 20 terminate slightly above the cast holder plate and lie in contiguous relation with said plate.

Retaining planes or members 48 are hinged upon slide plates 49 through a screw 50 which may be tightened or loosened for adjustment of the relatively angular position of the members 48 and 49. The plates 49 are slotted as designated by 49ª, and a screw 51 is inserted in the slot and threaded into the base 40. The plates 49 may be adjusted in position relatively to the base by means of the screw 51 which will hold the plate and correlated retaining plate 48 in any desired position. The plurality of retaining planes function in combination with the upper ends of the vibratory members for confining the cast holder plate 46 in proper position upon the table 44.

A post 53 is formed as a part of the base and extends vertically therefrom. A bracket 54 provided with bores 55 is slidably confined on the post and secured in any position thereto by the knurled thumb screw 56. A tooth cast holder yoke 57 is adjustably inserted in the bracket 54, adjustment of said yoke being had through the set screws 58, which are threaded to the bracket and impress against the yoke.

The foregoing description discloses as a complete assembly the several operating parts comprising the articulator element, which is driven in operation from the transmission means heretofore described.

The upper and lower jaws to the casts C and D are shown in dotted lines in Fig. 1, locating the positions of said casts in respect to the articulator element.

The cast C is secured into the holder yoke by any suitable means such as incasing the said cast therein with plastic material used by dental mechanics. Cast D will be similarly secured to the holder 46 by fixing it to lugs integral with said holder or by any other appropriate means. The transmission is driven through the main drive shaft by appropriate means, and thus impresses high frequency articulation into the holder plate of the articulator element. The cams 35 may be so timed in their revolving action that they will alternately impress movement against the arms 21. Thus the oppositely disposed articulator stems 20 coöperate to set up a continuously articulating motion of the cast holder 46 transversely and parallel to the articulating table. At the same time this action is progressing the cam 6 sets up an articulating motion through the stem 11 into the cast holder of the articulating element. This last described motion is impressed back and forward across the articulator table. The cam 6 also functions to continuously reciprocate the articulating shaft 10 subjecting the cast holder 46 to a slight vertical motion. These three motions of operation just described are continuously impressed into the articulator element thus thoroughly and effectively working the teeth of the casts C and D in a vertically engaged relation adapted to grind and abrase the masticating and contacting edges of the teeth until said edges thoroughly and adequately register one with the other. An abrasive compound such as carborundum and glycerin will be intermittently painted into the engaged edges of the teeth during the operation. The relative position of the casts in Fig. 1 will show a space between said casts. Through the use of the adjustable holder 57 the cast C will be brought down into proper contact with cast D and likewise adjustment of all parts of the apparatus will be effected prior to starting the motor which is connected to the shaft 1. It will not be necessary for a mechanic to constantly attend the machine while in operation. Thus this motor driven articulator will find a broad field of convenient use in the art of mechanical dentistry.

Having thus described my invention, what I claim as new, and desire to secure by Letters-Patent is as follows:

1. In a power transmission apparatus for running dental articulators, comprising in combination; vibrating arms for engagement with an articulator, cam rollers engaging the vibrating arms, and a gear set for driving the cam rollers.

2. In a power driving means for dental articulators, comprising in combination; vibrating articulator arms for engagement with a dental articulator, cam rollers engaging the vibrating arms, a gear set for driving the cam rollers, and an articulator shaft coöperating with the gear set for transmitting reciprocating motion to a dental articulator.

3. In a power driving apparatus for dental articulators, comprising in combination; vibrating arms adapted to engage a dental articulator, cam rollers employed for actuating the vibrating arms, drive shafts carrying the cam rollers, and gears fixed on the shafts.

4. In a power driving means for dental articulators, comprising in combination; a drive shaft, cam shafts driven from the drive shaft, cams fixed upon the cam shafts, and pivoted vibrating articulator arms engaging the cams for transmitting vibratory motion from the cams to the said dental articulator.

5. In a power driving means for dental articulators, comprising in combination; a drive shaft, cam shafts driven from the drive shaft, cams fixed upon the cam shafts, pivoted vibrating articulator cams for engagement with a dental articulator and engaging the cams for transmitting vibrating articulator motion from the cams to aforesaid dental articulator, and a reciprocating shaft adapted to impart short stroke articulating movements to the dental articulator.

6. In a power driving means for dental articulators, comprising in combination; a drive shaft, cam shafts driven from the drive shaft, cams fixed upon the cam shafts, pivoted vibrating articulator arms for engagement with a dental articulator and likewise engaging the cams, a reciprocating shaft adapted to impart motion to the dental articulator, and a means provided to actuate the reciprocating shaft.

7. In a power driving means for dental articulators, comprising in combination; a power driven shaft, cams operated by the shaft, pivoted vibrating members comprising flexible stems for engagement with a dental articulator and for engagement with the aforesaid cams for transmitting high frequency vibratory motion to the dental articulator.

8. In a power driving means for dental articulators, comprising in combination; a power driven shaft, cams driven by the shaft, pivoted articulating members comprising flexible stems for engagement with a dental articulator and with arms engaging the aforesaid cams for transmitting high frequency vibratory motion to the aforesaid dental articulator, and a shaft for attachment to a dental articulator and engaging one of the aforesaid cams for transmitting reciprocating motion to the dental articulator.

9. In a power driving means for dental articulators, comprising in combination; a power driven shaft, a cam with a groove formed therein fixed to the power driven shaft, and a reciprocating articulator shaft adapted to operate in engagement with the grooved cam and said shaft adapted to be connected with the dental articulator for transmitting vibratory motion thereto.

WALTER J. WILSON.